United States Patent [19]

Bruni

[11] Patent Number: 4,674,399
[45] Date of Patent: Jun. 23, 1987

[54] PISTONS FOR INTERNAL COMBUSTION ENGINES

[75] Inventor: Ludovico Bruni, Turin, Italy

[73] Assignee: AE PLC, Warwickshire, England

[21] Appl. No.: 669,786

[22] Filed: Nov. 9, 1984

Related U.S. Application Data

[63] Continuation-in-part of Ser. No. 403,857, Jul. 30, 1982.

[30] Foreign Application Priority Data

Jul. 31, 1981 [IT]  Italy .................... 68087-A-81
Dec. 2, 1981 [IT]  Italy .................... 68562-A-81

[51] Int. Cl.$^4$ ............................ F01B 31/10
[52] U.S. Cl. ........................ 92/158; 92/235; 92/239; 123/193 P
[58] Field of Search .......... 92/158, 172, 208, 210, 92/234, 235, 237, 239, DIG. 1; 277/194 277/194

[56] References Cited

U.S. PATENT DOCUMENTS

| | | | |
|---|---|---|---|
| 1,462,501 | 7/1923 | Barwald | 92/158 |
| 1,881,237 | 10/1932 | Nelson | 92/237 |
| 1,949,542 | 3/1934 | Larkin | 92/235 |
| 2,032,849 | 3/1936 | Nelson | 92/237 |
| 2,379,359 | 6/1945 | Kettering | 92/239 |
| 2,420,474 | 5/1947 | Graham | 92/239 |
| 2,864,660 | 12/1958 | Seubert, Jr. et al. | 92/158 |
| 3,009,749 | 11/1961 | Cornet | 92/239 |
| 3,259,028 | 7/1966 | Hutto | 92/230 |
| 3,307,456 | 3/1967 | Etienne | 92/237 |
| 3,613,521 | 10/1971 | Itano | 92/231 |
| 3,893,675 | 7/1975 | Geffroy | 277/194 |
| 4,161,165 | 7/1979 | Belush et al. | 92/237 |
| 4,354,426 | 10/1982 | Steiple | 92/235 |
| 4,362,136 | 12/1982 | Lipp | 123/193 P |

Primary Examiner—Robert E. Garrett
Assistant Examiner—Mark A. Williamson
Attorney, Agent, or Firm—Leydig, Voit & Mayer

[57] ABSTRACT

A piston for an internal combustion engine has the conventional skirt replaced by top and bottom bearing surfaces spaced apart by a substantial gap of constant width. The top bearing surfaces are connected to the piston crown through the ring band whereas the bottom surfaces are attached to piston bosses by struts. The gap allows the passage of lubricant to the cylinder to ensure adequate lubrication of the bearing surfaces.

8 Claims, 8 Drawing Figures

PISTONS FOR INTERNAL COMBUSTION ENGINES

This application is a continuation-in-part of U.S. patent application No. 403,857 filed July 30, 1982.

BACKGROUND TO THE INVENTION

1. Field of the Invention

The invention relates to pistons for internal combustion engines.

2. Discussion of the Prior Art

A conventional piston for an internal combustion engine comprises a crown, a gudgeon pin bore and a skirt extending all around the piston. The skirt performs no gas sealing function; this is provided by piston rings carried on the piston. Rather, the skirt transmits lateral thrust on the piston produced by a connecting rod during reciprocation to an associated cylinder or liner.

Although the weight of such pistons has, in recent years, been reduced by use of aluminium or aluminium alloys, such pistons are still comparatively heavy and the area of skirt in contact with the cylinder or liner provides a considerable frictional force which must be overcome by the engine, so reducing its power. There have been various proposals for reducing the area of the skirt, but, in general, they have not achieved commercial success because of problems of lubrication and skirt rigidity.

SUMMARY OF THE INVENTION

According to a first aspect of the invention, there is provided a piston for an internal combustion engine comprising a crown, a pair of gudgeon pin bores, a pair of gudgeon pin bosses, reinforced flanged struts extending normal to the axis of the gudgeon pin bores from each gudgeon pin boss toward both sides of the piston opposite a plane including the piston axis and the gudgeon pin bore axis, said struts having an end portion at one of said sides of the pistons, first and second bearing surfaces on each of said sides of the piston extending only partially around the piston, said first bearing surface on each of said sides of the piston being toward the crown-end of the piston and having a lower edge lying entirely in a plane normal to the piston axis, said second bearing surface on each of said sides of the piston having upper and lower edges extending circumferentially from the end portion of one of said struts and lying entirely in respective planes normal to the piston axis, the plane of the lower edge of the crown-end bearing surface being spaced axially from the plane of the upper edge of the second bearing surface on each of said sides of the piston to define therebetween a substantially axially and circumferentially extending gap, a chamfer provided on at least one of the upper and lower edges of the second bearing surface on each of said sides of the piston for supplying lubricant over said second bearing surface.

According to a second aspect of the invention, there is provided a piston for an internal combustion engine comprising a crown, a ring band extending around the crown, a gudgeon pin bore, two bearing surfaces which lie to one side of a plane including the piston axis and the gudgeon pin bore axis, which are disposed about a plane including the piston axis and normal to the gudgeon pin bore axis and which extend only partially around the piston, two bearing surfaces which lie to the other side of the plane including the piston axis and the gudgeon pin bore axis, which are disposed about the plane including the piston axis and normal to the gudgeon pin bore axis and which extend only partially around the piston, in each two bearing surfaces, one bearing surface being towards the crown-end of the piston and depending from the ring band, and having a lower edge lying entirely in a plane normal to the piston axis, in each two bearing surfaces, the remaining bearing surface having upper and lower edges lying entirely in respective planes normal to the piston axis, and being cantilevered on a pair of struts, in each two bearing surfaces, the plane of the lower edge of the crown-end bearing surface being spaced axially from the plane of the upper edge of the at least one remaining bearing surface to define therebetween a substantial axially and circumferentially extending gap of such a constant width therealong as to allow lubricant to pass through said gap from the interior of the piston, a chamfer provided on at least one of the upper and lower edges of the bearing surface for supplying said lubricant over said bearing surfaces.

BRIEF DESCRIPTION OF THE DRAWINGS

The following is a more detailed description of two embodiments of the invention, by way of example, reference being made to the accompanying drawings in which.

DESCRIPTION OF THE PREFERRED EMBODIMENTS

Figure 1:
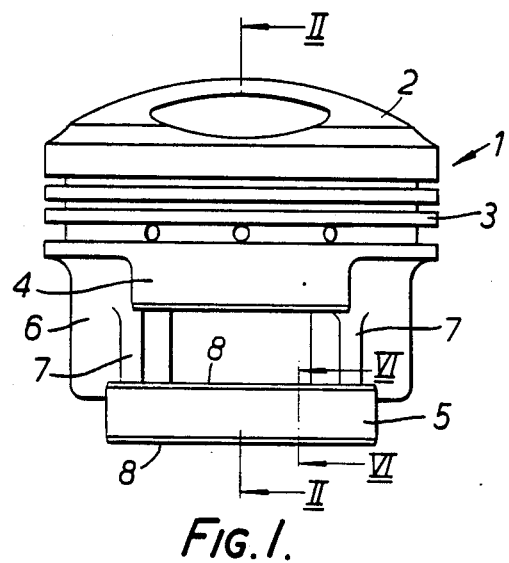
FIG. 1 is a side elevation of a first form of piston.
Figure 2:
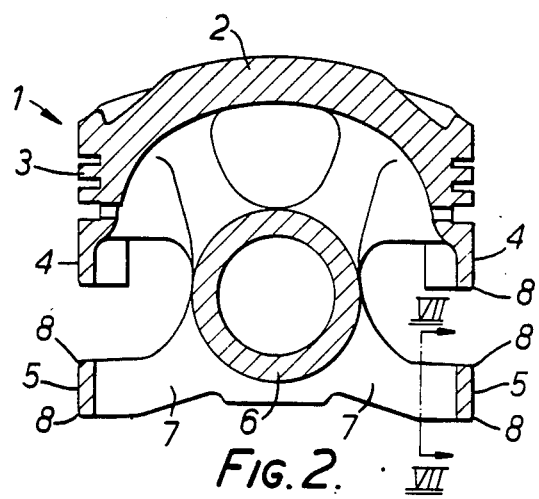
FIG. 2 is a section on the line II—II of FIG. 1.
Figure 4:
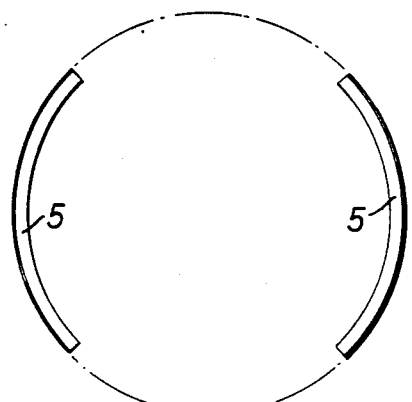
FIG. 4 is a schematic view from beneath of the piston of FIGS. 1 and 2.

Referring first to FIGS. 1, 2 and 4, the first piston 1 comprises a crown 2 surrounded by a ring band 3 for receiving the piston rings (not shown). Gudgeon pin bosses 6 are provided which define pair of gudgeon pin bores (see FIG. 2) extending through the piston.

Figure 7A:
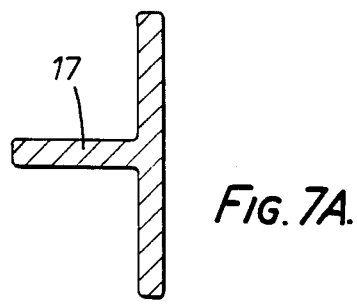
Figure 7B:
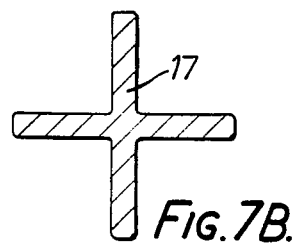

On both sides of a plane containing the gudgeon pin bore axis and the piston axis, the piston is provided with two bearing surfaces 4, 5, longitudinally spaced by an axially and circumferentially extending gap. The crown-end bearing surface 4 depends from the ring band (see FIG. 2) while the remaining lower, bearing surface 5 is connected to the gudgeon pin bosses 6 by a pair of struts 7 (which may be formed as described below with reference to FIGS. 7A and 7B). The lower bearing surface 5 is thus cantilevered on, and extends between, the ends of the struts 7 and is otherwise unsupported. The bearing surfaces 4, 5 are symmetrically disposed about a plane including the piston axis and normal to the gudgeon pin axis (i.e. the plane of the section of FIG. 2), and extend only partially around the circumference of the piston. For example, they may extend up to 45° on either side of this plane.

In a modified arrangement (not shown) the struts 7 may carry the bearing surface 5 in addition to the bearing surface 4.

The bearing surfaces 4, 5 are of generally part-cylindrical shape with a lower edge of the crown-end bearing surface 4 and the two circumferentially extending edges of the lower bearing surface 5 lying in respective planes normal to the piston axis for their entire lengths. The lower bearing surface 5 is thus of constant width, in an axial direction, around the whole of its circumferential extent, as seen clearly in FIG. 1. It thus follows, from this arrangement of the edges, that the axially and circumferentially extending gap is of constant width along its entire circumferential extent; this also being seen clearly in FIG. 1 of the drawings. This width is a constant maximum, for reasons to be explained below, as seen clearly in FIGS. 1 and 2, and may be at least as great as the width of the lower bearing surface 5 (i.e. the gap width/surface width ratio is greater than 1:1). The lower edge of the crown-end bearing surface 4 and the two circumferentially extending edges of the lower bearing surface 5 are provided with chamfers 8.

Figure 6:
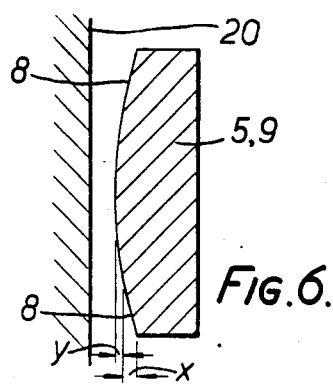
FIG. 6 is a section on the lines VI—VI of FIG. 1 or FIG. 3, and FIGS. 7A and 7B are alternative sections on the line VII—VII of FIG. 2.

A preferred shape of the lower bearing surface 5 and the associated chamfers 8 is shown in FIG. 6 in a very exaggerated manner. The surface 5 is curved in planes including the piston axis with a maximum radial depth (y in FIG. 6) of, for example, 0.02 mm. The chamfers 8 are planar in planes including the piston axis, the length of the chamfers being 1 mm with the chamfers being inclined at an angle of between 1 and 15° to the vertical or the length of the chamfers being 1 mm with a radial depth ($\chi$ in FIG. 6) of 0.04 mm. The chamfers 8 may, however, be curved and it will be appreciated that they, and the surface, may have any suitable shape. It will also be appreciated that the chamfer 8 on the lower edge of the crown-end bearing surface 4 may be of similar dimensions to the preferred shape described above.

In use, the lateral thrust loads on the piston are transmitted to the associated cylinder or liner 20 (FIG. 6) by the bearing surfaces 4, 5. The presence of the chamfers 8 ensures a supply of lubricant over the bearing surfaces 4, 5 during reciprocation by forming a passage of decreasing dimensions leading to the associated surface. This forces lubricant under pressure over the surfaces and thus full hydrodynamic lubrication. In the lower bearing surface 5, where this is curved as shown in FIG. 6, this curvature also assist in ensuring adequate lubrication. The reduced size of the bearing surfaces 4, 5 and the windows thereby defined in the skirt reduces the weight of the piston so reducing the power requirement. In addition, the frictional losses in contact between the piston and the associated cylinder or liner are reduced as a result of the reduced area of the bearing surfaces in comparison with a conventional piston having a continuous skirt. The constant maximum spacing between the surfaces, described above, thus ensures that the width of the gap is also a maximum, and may be at least as great as the width of the lower bearing surface. The purpose of a gap of this size is to ensure an adequate supply of oil on the surface of the associated cylinder or liner for passage over the bearing surfaces so that the bearing surfaces are always adequately lubricated, so avoiding any possibility of mixed or boundary lubrication as a result of the reduced areas of the bearing surfaces. This is achieved in the following way. It is well known, that during reciprocation of the piston, oil contained in a crank case beneath the piston splashes or sprays up towards the undersurface of the piston to lubricate the piston and cylinder or liner (see for example, "Fuel and Lubrication" in the article on Automobiles, page 521 of the 15th Edition of the New Encyclopaedia Britannica and the article under Lubrication System on page 827 of the 1979 Edition of the Encyclopaedia Americana (International Edition)). Due to the presence of the substantial gap, some of this oil also splashes through the gap onto that portion of the cylinder or liner surface momentarily uncovered by the gap. This means that there is always a supply of oil in this gap available for passage over the bearing surfaces, both when the piston is in a compression stroke and when it is in an expansion stroke.

Figure 3:
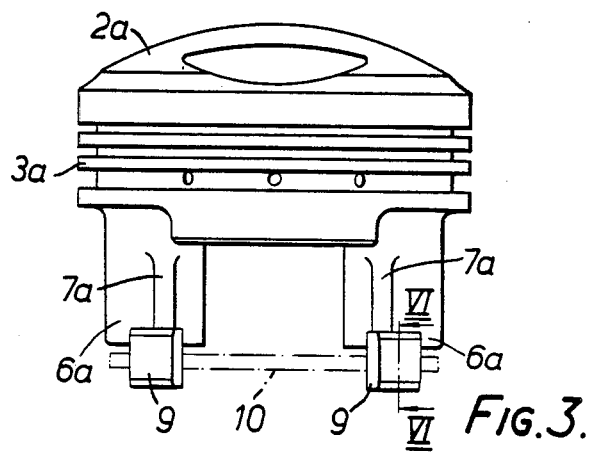
FIG. 3 is a side elevation of an alternative embodiment of the first form of the invention.
Figure 5:
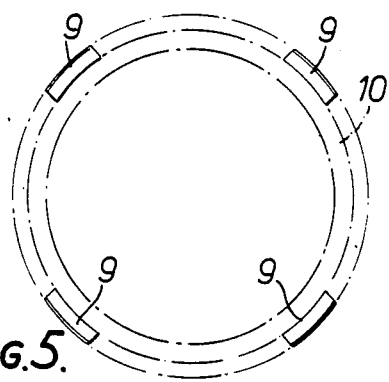
FIG. 5 is a schematic view from beneath of the piston of FIG. 3.

Referring next to FIGS. 3 and 5, the modified piston shown therein is generally similar to the piston of FIGS. 1, 2 and 4 and parts common to FIGS. 3 and 5 and FIGS. 1, 2 and 4 are given the same reference numerals, but with the subscript a, and will not be described in detail. In this modified embodiment, the bearing surfaces 5 remote from the crown 2 are each replaced by a pair of circumferentially spaced generally rectangular sectors 9. A pair of spaced gudgeon pin bosses 6a are provided and each sector 9 of each pair of sectors is connected to an associated boss 6a by a strut 7a (which may be formed as described below with reference to FIGS. 7A and 7B). The sectors 9 are provided with chamfers in the same way as the bearing surface 5 and may have the cross-sectional dimensions as described above with reference to FIG. 6. The sectors 9 are axially aligned.

A metallic ring 10, shown in broken line in FIGS. 3 and 5, interconnects the four sectors 9 and acts to control the expansion of the sectors 9 in a radial direction.

The piston of FIGS. 3 and 5, operates in generally the same way as the piston of FIGS. 1, 2 and 4 with generally the same advantages. Since, however, the sectors 9 have a lesser area than the bearing surface 5, there will be a further reduction in both weight and friction with consequential advantages.

Because the lower bearing surfaces 5, 9 of the embodiments of FIGS. 1 to 6 are supported only by the respective struts 7, 17, these struts are highly loaded. In order to prevent any possibility of strut failure, the struts may be flanged so they have, for example, T-cross-section of FIG. 7A or the +-cross-section of FIG. 7B.

It will be appreciated, that more than two bearing surfaces may be provided on both sides of the plane including the piston and gudgeon pin bore axes. For example, as in FIGS. 3 and 5, three such surfaces may be provided, or four or more surfaces.

I claim

1. A piston for an internal combustion engine comprising:
   a crown,
   a pair of gudgeon pin bores,
   a pair of gudgeon pin bosses,
   reinforced flanged struts extending normal to the axis of the gudgeon pin bores from each gudgeon pin boss towards both sides of the piston on opposite sides of a plane including the piston axis and the gudgeon pin bore axis, said struts each having an end portion at one end of said sides of the piston,
   first and second bearing surfaces on each of said sides of the piston extending only partially around the piston and forming the total bearing surface of the piston,
   said first bearing surface on each of said sides of the piston being toward the crown-end of the piston and having a lower edge lying entirely in a plane normal to the piston axis, said second bearing surface on each of said sides of the piston extending from associated end portions of said struts, being supported solely by said struts and having upper and lower edges extending circumferentially from the end portions of the associated struts and lying entirely in respective planes normal to the piston axis, said upper and lower edges having a predetermined distance therebetween, the plane of the lower edge of the crown-end bearing surface being spaced axially from the plane of the upper edge of the second bearing surface on each of said sides of the piston to define therebetween a substantial axially and circumferentially extending gap whose axial length is at least as great as said predetermined distance for the passage of lubricant therethrough to a wall of an associated cylinder.

2. A piston according to claim 1, wherein a single said first bearing surface is provided on each of said sides and a single said second bearing surface is provided on each of said sides, spaced by said gap from said first bearing surface.

3. A piston according to claim 1, wherein a single said first bearing surface is provided on each of said sides and two said second bearing surfaces are provided on each of said sides, the two said second surfaces being circumferentially spaced but axially aligned.

4. A piston according to claim 3, wherein the two said second bearing surfaces on one of said sides and the two said second bearing surfaces on the other of said sides are interconnected by a metallic band extending around the piston.

5. A piston according to claim 1, wherein the chamfer is planar or curved in planes including the piston axis.

6. A piston according to claim 5, wherein the second bearing surface on each of said sides is barrelled so that said surface is curved in planes including the piston axis for directing lubricant over said surface during reciprocation.

7. A piston according to claim 1, wherein two struts are provided for said second bearing surface on each of said sides.

8. A piston according to claim 7, wherein each strut has a cross-section selected from the group of T-shape or +-shape and is cast integrally with the remainder of the piston.

* * * * *